United States Patent [19] [11] 4,258,840
Conkle [45] Mar. 31, 1981

[54] MOUNTING FOR CENTRIFUGAL SWITCH AND CONVEYOR BELT POWERED ACCESSORIES

[76] Inventor: Ellsworth V. Conkle, P.O. Box 190, Paonia, Colo. 81428

[21] Appl. No.: 97,731

[22] Filed: Nov. 26, 1979

[51] Int. Cl.³ .............................................. B65G 43/00
[52] U.S. Cl. ..................................... 198/502; 73/488; 198/855
[58] Field of Search ................................ 198/502–505, 198/499, 571, 855; 74/263, 380, 15.6, 15.8, 12, 840, 384; 73/2, 488, 493, 495, 509, 529

[56] References Cited
U.S. PATENT DOCUMENTS 3,656,610  4/1972  McWilliams .......................... 198/499
4,088,222  5/1978  Hurt ..................................... 198/502

Primary Examiner—Robert B. Reeves
Assistant Examiner—Douglas D. Watts
Attorney, Agent, or Firm—Harvey B. Jacobson

[57] ABSTRACT

A framework comprising a pair of parallel angle sections is hung from the cable of a suspended conveyor system or fixedly mounted to a frame member of a conveyor system. An operative structure comprising a drive wheel connected through a shaft to a driven element is pivotally mounted to the framework with the drive wheel being suspended upon the upper surface of the return portion of the conveyor belt. In this manner, the drive wheel is maintained out of contact with the soiled surface of the conveyor belt thereby eliminating the need for periodic cleaning of the wheel and driven structure. An offset mounting can be included on the framework for forcing the wheel into firm engagement with the conveyor belt to insure accurate and continuous drive contact between the belt and wheel.

10 Claims, 10 Drawing Figures

MOUNTING FOR CENTRIFUGAL SWITCH AND CONVEYOR BELT POWERED ACCESSORIES

BACKGROUND OF THE INVENTION

1. Field of the Invention

This invention relates to endless conveyor belt systems and especially to accessory devices adapted for use with such systems and configured to be powered by the conveyor belt itself.

2. Discussion of Related Art

In coal mines and the like, endless belt conveyors are often used to transport the mined mineral from within the mine itself. Customarily, centrifugal switches are connected to the lower portion of the return belt of each conveyor to provide an indication of the operative condition of the particular belt in question. All mines use two of these switches on each belt operating in any sequence of belts. Often the belts are at 90° angles to each other with a first belt dumping a load onto the next belt in line. On each belt line in the system, there is a large belt drive unit at the head end of the belt and a tail piece at the far end for the next belt to dump onto. One of the centrifugal switches is put just behind each drive unit on the return portion of the belt. This is for protection of the drive unit. In case the belt is overloaded and slows down, the switch opens, cutting power to the motor causing the belt drive to stop thereby preventing the motor from burning up. Another centrifugal switch is placed just ahead of each tail piece. When this switch is up to speed, it automatically starts the next succeeding belt drive. Thus, if any belt in the system stops, the centrifugal switches automatically stop all the drive units behind them, so that there will be no pile up of mined minerals on the tail piece of the belt that has stopped.

One system for connection of such centrifugal switches is to urge a roller against the bottom surface of the return belt of the endless conveyor. Such a system makes engagement between the centrifugal switch drive mechanism and the dirty side of the belt causing the drive mechanism to become clogged and eventually inoperative.

In order to avoid such deficiencies, it has been suggested to engage the centrifugal switch drive to the clean side of the belt. U.S. Pat. No. 4,088,222, issued May 9, 1978 to Hurt, shows a belt switch for an endless conveyor monitoring switch assembly which includes an elongated frame having a shaft journalled for rotation therein and extending longitudinally therealong. A drive wheel attached to and rotatable with the shaft at a first end of an elongated frame and a detecting switch is attached to the shaft at the opposite end of the elongated frame. A seesaw, U-shaped mounting member is attached to the elongated frame at a point intermediate the drive wheel of the detecting switch for mounting the elongated frame on an endless conveyor cable support. The mounting member allows the weight of the elongated frame and its attachment to pivot the frame in a seesaw manner to bring the drive wheel into contact with the lower surface of the upper belt of the conveyor. Other systems which show mounting and drive wheels for engagement with the clean side of a conveyor belt include U.S. Pat. No. 3,139,217, issued June 30, 1964 to Mell, and U.S. Pat. No. 1,973,312, issued Sept. 11, 1934 to Hardinge.

SUMMARY OF THE INVENTION

One object of the present invention is to provide a mounting for centrifugal switches and conveyor belt powered accessories which is relatively simple in construction, effective and durable in use.

A further object of the present invention is to provide a mounting force for centrifugal switches and conveyor belt powered accessories which is easily adapted for use either on the suspension cord of a suspended conveyor belt or connectible to a frame member of a frame supported conveyor belt.

A still further object of the present invention is to provide a mounting for centrifugal switches and conveyor belt accessories which includes components for stabilizing the centrifugal switch or accessories on the conveyor belt for providing maximum power transfer.

In accordance with the above objects, the mounting of the present invention includes a three-sided framework having two vertical sections produced from angle iron and formed with a plurality of laterally aligned holes for mounting a pivot pin upon which the centrifugal switch or accessories are mounted. A top lateral element rigidifies the framework and insures proper spacing of the two vertical members. A pair of adjustable hooks extend from one leg of each vertical member for attachment to the suspension cable of the conveyor system. A drive wheel is mounted on a shaft which operates the centrifugal switch or belt powered accessories. A tensioning device such a spring loaded plunger or turnbuckle can be attached between the third member of the framework and the shaft to properly force the drive wheel into engagement with the belt of the conveyor system. In cooperation with such spring or turnbuckle, a telescoping rod extends between the third frame member and the opposite suspension cable of the conveyor system for stabilizing the framework. An additional embodiment of the device is disclosed which can be mounted on a frame member of a frame supported conveyor.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
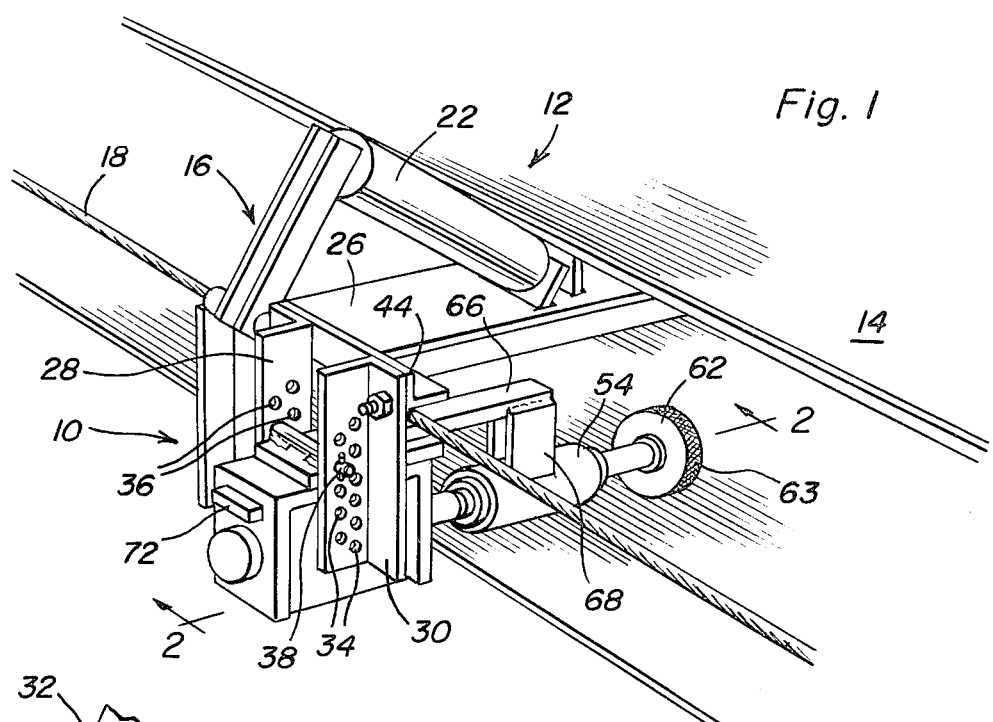
FIG. 1 shows a perspective view of the mounting for centrifugal switches and a conveyor belt powered accessories.
Figure 2:
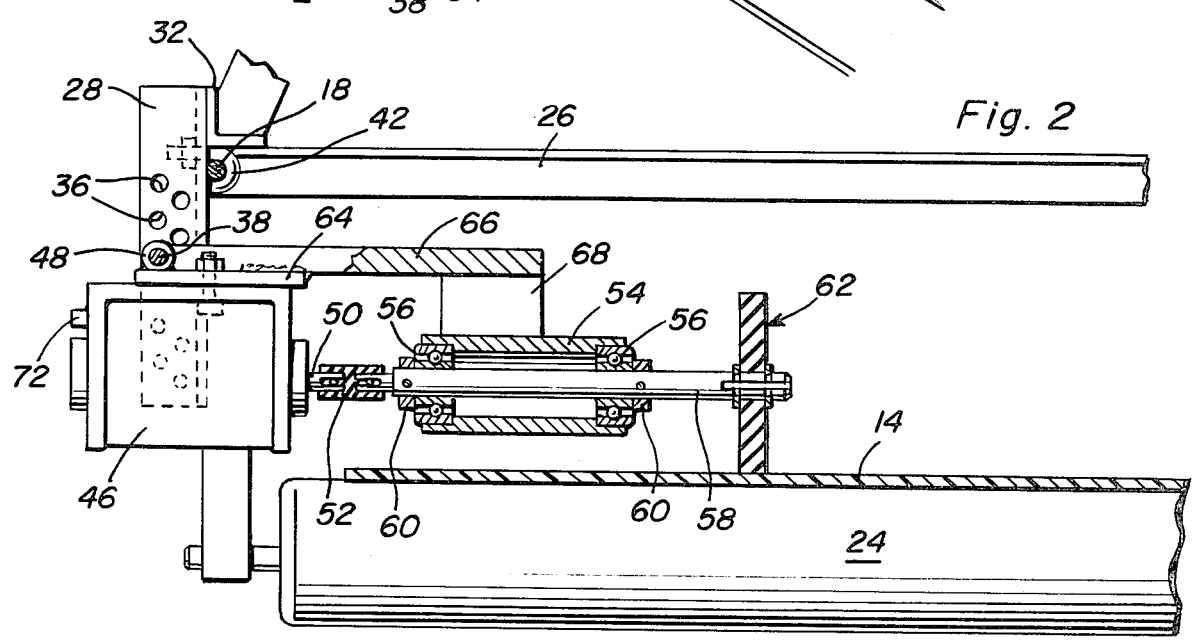
FIG. 2 is a longitudinal elevational sectional view taken substantially along a plane passing through section line 2—2 of FIG. 1.
Figure 3:
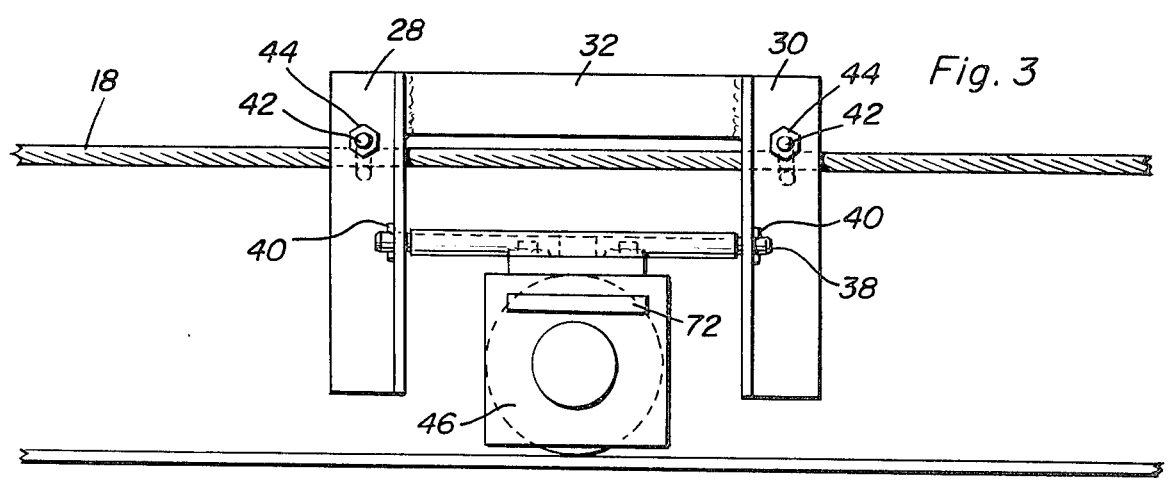
FIG. 3 is an end elevational view of the structure of FIG. 1.

Now with reference to the drawings, a mounting for centrifugal switches and conveyor belt powered accessories incorporating the principles and concepts of the present invention and generally referred to by the reference numeral 10 will be set forth in detail. With particular reference to FIGS. 1-3, it will be seen that a standard suspended conveyor system 12 comprises endless belt 14 and a plurality of belt supports such as one shown at 16. The belt supports 16 are held in vertically spaced position from the mine floor through use of suspension cables such as that shown at 18 which extend along each side of the conveyor. Belt supports 16 comprise three upper rollers which hold the upper belt portion in a trough shape for carrying coal or the like. Two of the three upper rollers are shown at 20 and 22 with a third roller being disposed in an opposed relationship to roller 22 to form the trough shape. A support roller 24 is disposed below the lower or return level of the conveyor belt 12 and supports that conveyor belt in a substantially planar manner. A frame member 26 extends across the width of the conveyor belt 12 and supports the top rollers and bottom roller 24.

The mount 10 itself comprises a pair of parallel vertically oriented angle sections 28 and 30 which are interconnected by a third angle section 32. Angle sections 28 and 30 each have one leg extending parallel to the conveyor belt 14 and one leg extending laterally away from the conveyor belt 14. The legs extending laterally away from the belt each have a plurality of holes 34 and 36 drilled therein. Holes 34 and 36 are aligned in pairs to receive a pivot pin 38. This allows vertical adjustability of height of the pivot pin 38. Cotter pins 40 or the like can be inserted through the free ends of pivot pin 38 in order to hold it in place in two of the aligned holes. Mounted on the parallel legs of each angle section 28, 30 are cable clamps 42 which are J-shaped with the curved part of the J extending around cable 18 and the straight part being threaded and extending through an opening in one of the angle sections. Nuts 44 threadedly engage the clamps 42 and cause them to be tightened around cable 18 thereby suspending section 28, 30 and 32 from the cable. Shown suspended from pivot pin 38 is a centrifugal switch 46 which can be any standardly available centrifugal switch commonly used in conveyor belt systems. A pivot tube 48 is mounted atop the centrifugal switch 46 and disposed in surrounding relation to the pivot pin 38. Accordingly, it can be seen that switch 46 is free to pivot about pin 38. An input shaft 50 of the centrifugal switch is attached through flexible coupling 52 to bearing housing 54. Bearing housing 54 mounts a pair of bearings 56 which are pressed into the housing 54 and support and journal shaft 58. A pair of retainer rings 60 are held on shaft 58 through the use of set screws or the like and insure that the bearings 56 will not slide from housing 54. The inner end of shaft 58 is reduced to the diameter of shaft 50 and attached to flexible coupling 52. The opposite end of shaft 58 mounts drive wheel 62 which is a steel drive wheel keyed to shaft 58 and includes a knurled face 63 for engaging the upper surface of the lower portion of belt 14.

The mounting for pivot tube 48 includes a plate 64 which is bolted directly to the top of switch 46. The tube 48 is welded to plate 64 along with control arm 66 which extends away from plate 64 parallel to shaft 58. Control arm 66 supports the bearing housing 54 and maintains shaft 58 in alignment with shaft 50 through the use of a pair of plates 68 which are welded between control arm 66 and housing 54.

Accordingly, it can be seen that since the pivot tube 48 is mounted above switch 46 and the remainder of the structure including the control arm 66 and shaft 58 extend away from switch 46, a torque will be created about the pivot pin 38 forcing wheel 62 into engagement with the upper surface of the lower level of belt 14. In this manner, wheel 62 will turn as the conveyor belt 14 moves and switch 46 can sense the movement of the conveyor belt thereby controlling operation of the main conveyor drive motor or adjacent conveyor belts as discussed hereinabove.

Figure 6:
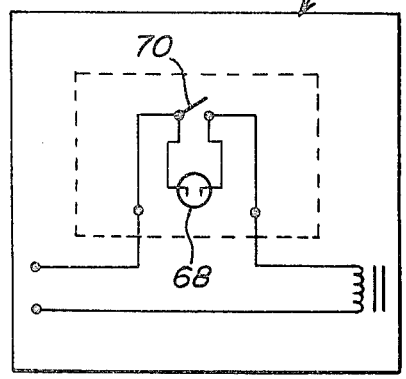
FIG. 6 is a schematic diagram illustrating a warning light system to be used with the centrifugal switch.

At times, it is helpful to have a means of indicating the condition of the contacts of switch 46. Accordingly, as a part of this invention, an indicator circuit shown in FIG. 6 is included in the switch 46. In FIG. 6, it may be seen that a neon bulb 68 is connected across the contact 70 of the centrifugal switch 46. In this manner, when the contacts 70 are opened for any reason, neon bulb 68 will be lit and indicate such state. When the contacts are closed, bulb 68 is shorted and does not light. Accordingly, if the contacts become corroded or the like, bulb 70 will provide an indication of such condition. Each switch 46 should be provided with a circuit as shown in FIG. 6 with each individual bulb 68 being disposed in a transparent or translucent housing as shown at 72 in FIGS. 1-3.

Figure 4:
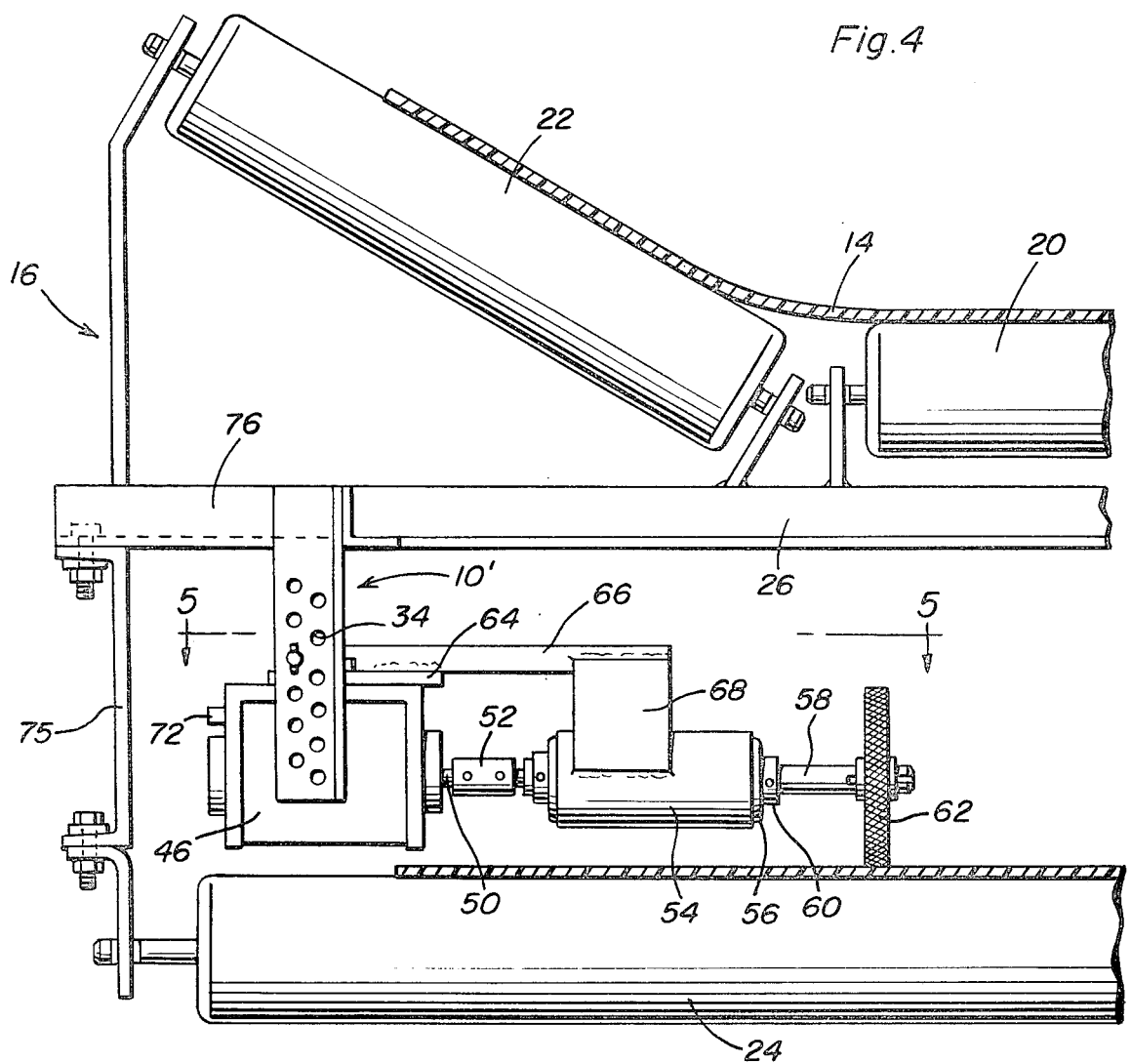
FIG. 4 is an elevational view of a second embodiment of the mount for use with a steel framework belt system.
Figure 5:
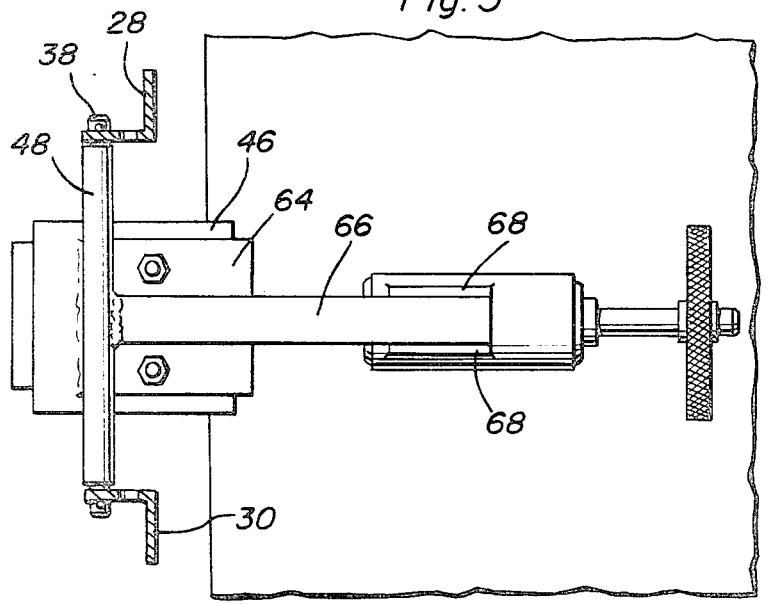
FIG. 5 is a top plan view taken substantially along a plane passing through section line 5—5 of FIG. 4.

FIGS. 4 and 5 shown a second embodiment of the mounting which is substantially identical to mount 10 and labelled generally 10'. Like elements of mounts 10 and 10' are labelled with like numerals. Mount 10' is adapted for connection to a conveyor belt which has a channel-shaped frame 75 in place of a suspension cable. Steel frame conveyor belts are normally used for surface conveyor systems while suspension conveyors are normally used underground. Mount 10' is in effect exactly the same as mount 10 except that in place of cable clamps, mount 10' uses additional angle sections such as the one shown at 76. Each angle section is attached to the laterally extending leg of one of the vertical angle sections 28, 30 with one leg of angle section 76 abutting and welded to the associated angle section 30 and the other leg of angle section 76 bolted to the top flange of frame member 75 in order to hold the mount 10' in secure relation thereto.

Figure 7:
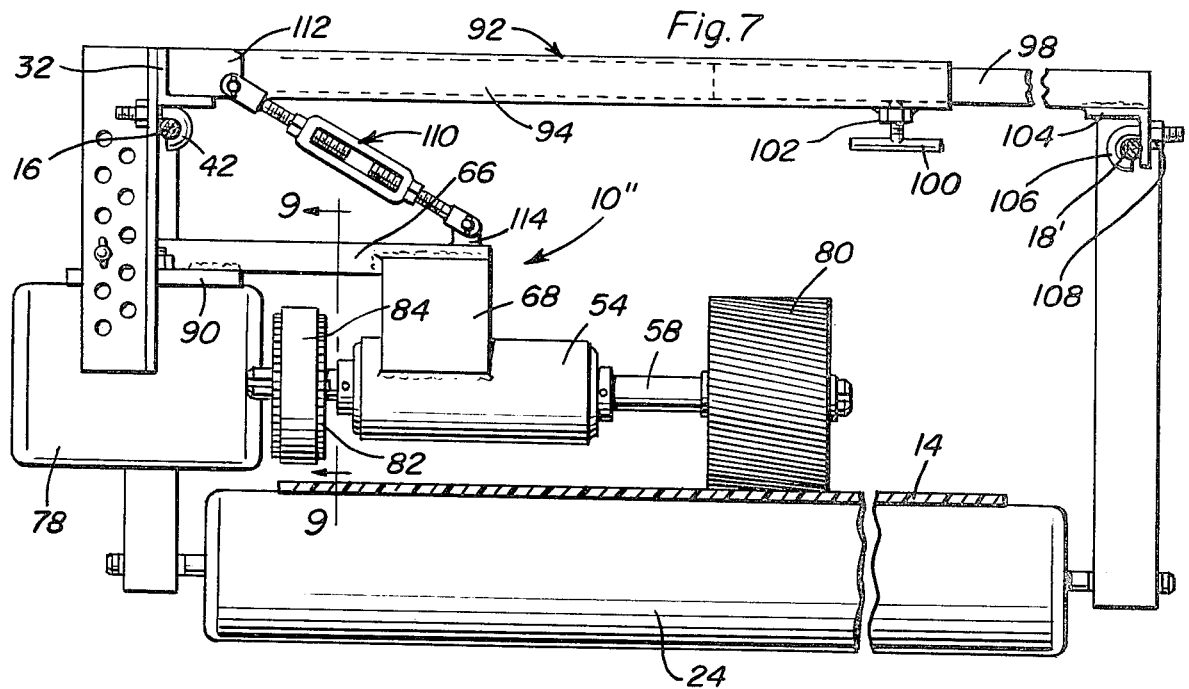
FIG. 7 is a side elevational view of a third embodiment of the invention shown in use with a conveyor powered assessory.
Figure 8:
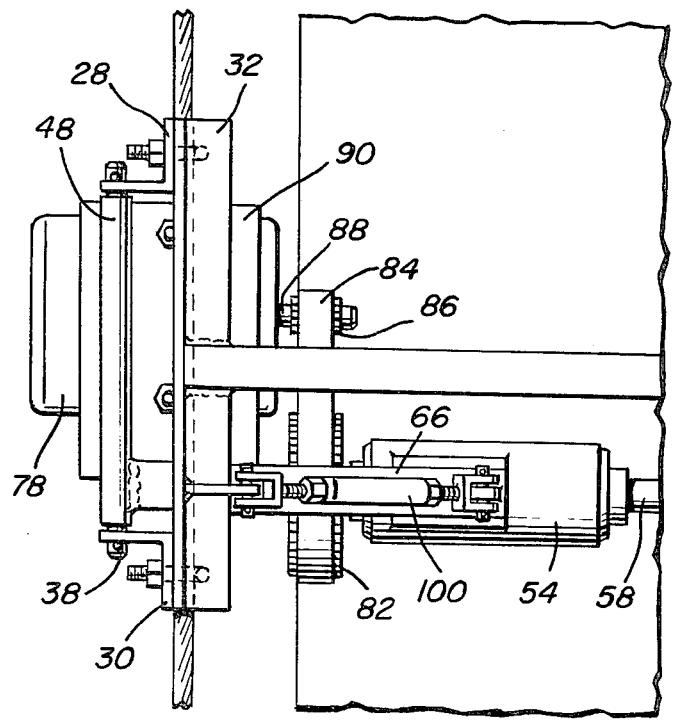
FIG. 8 is a fragmental top plan view of the device of FIG. 7.
Figure 9:
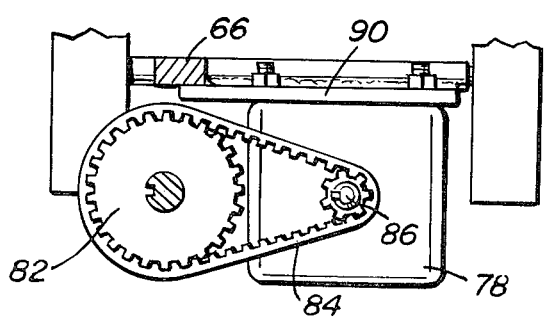
FIG. 9 is a transverse elevational sectional view taken substantially along a plane passing through section line 9—9 of FIG. 7.

With respect to FIGS. 7-9 and an additional embodiment of the mount, generally labelled 10" will be described. Mount 10" is configured to provide power to accessories at remote locations along the conveyor system. For instance, there is often a need for a water pump, generator or the like within the confines of the mine. Accordingly, such an accessory, generally referred to by the reference numeral 78 can be conveniently attached to suspension cables 16 through use of mount 10". Mount 10" is essentially the same as mount 10 and, accordingly, like elements are labelled with like numerals. In order to insure proper power pickup from belt 14 of the conveyor system, a much wider wheel 80 is used as the drive wheel. Wheel 80 is mounted upon shaft 58 which extends through bearing housing 54. The opposite end of shaft 58 mounts gear 82 of a step-up drive including that gear, belt 84 and drive gear 86. Drive gear 86 is mounted upon drive shaft 88 of powered accessory 78. An enlarged mounting plate 90 is welded to pivot tube 48 to allow offset monting of the control arm 66 and powered accessory 78 on the plate. This, of course, leaves room for the step-up gearing arrangement including elements 82, 84 and 86. In this manner, the speed of accessory 78 can be easily controlled by the gear ratio of the gear and belt drive. Of course, chain gears or belt and pulley arrangements can be used for this arrangement. Once again, it will be noted that control arm 66 through plate 68 serves to stabilize the bearing housing 54 and shaft 58.

However, due to the increased power takeoff requirements of an accessory such as a generator or pump, twisting of the entire mount 10' on the cable 16 may result. Accordingly, a mount stabilizing arm 92 is welded to angle section 32 and extends for the entire width of the conveyor system to engage the opposite suspension cable 18'. Stabilizing arm 92 is formed with a hollow rectangular tube 94 which telescopically receives solid bar 98. Adjustment of the effective length of stabilizing arm 92 is made by pulling bar 98 to the desired length and tightening wing bolt 100 which is threadedly engaged through nut 102 welded to the bar 94. Accordingly, bolt 100 forces elements 94, 98 into firm engagement. The free end of bar 98 mounts a small angle section 104 through which a second cable clamp 106 extends for engaging cable 18'. Obviously, with nut 108 of clamp 106 tightened to pull the clamp tightly around cable 18', twisting of the mount 10' is reduced to a minimum.

Finally, also due to the increased power transfer demand of the use of accessory 78, it may be necessary to provide a force engaging wheel 80 and belt 14 in addition to the gravitational force imposed by the offset mounting itself. Such a force can be applied through use of a turnbuckle 110. Turnbuckle 110 is engaged between a plate 112 welded to angle section 32 and a smaller plate 114 welded to the top of control arm 68. Turnbuckle 110 includes a pair of clevises which are mounted on plates 112 and 114. Accordingly, it may easily be seen that additional pressure can be applied through wheel 80 by merely adjusting turnbuckle 110 thereby forcing the inner end of control arm 66 downwardly.

Figure 10:
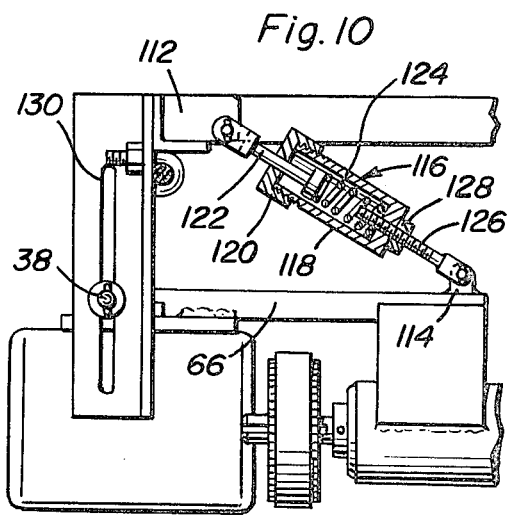
FIG. 10 is a fragmental view showing an alternate drive wheel load device for use in the invention.

FIG. 10 shows two other modifications which can be adapted for use with the mount. In place of turnbuckle 110, shown in FIGS. 7-9, a spring loaded plunger 116 can be used. Plunger 16 has a main body 118 threadedly connected to a cap 120. A plunger rod 122 extends through the cap and presses against compression spring 124 contained within body 118. An adjustable arm 126 is threaded through nut 128 connected to the bottom of body 118. Accordingly, by screwing arm 126 in or out, the tension between plates 112 and 114 can be adjusted. The advantage of plunger 116 is that the spring 124 can act as a shock absorber to take up any momentary variations in tension on belt 14 when the drive is engaged.

Further, in place of the plurality of mounting holes 34 and 36 shown in FIGS. 1-9, a single slot 130 can be disposed in each of the angle sections 28, 30 to allow continuous vertical adjustability of control arms 66 and the associated components of the drive. Naturally, as will be obvious to one of ordinary skill in the art, if continuous slot 130 is to be used, pivot pin 38 would necessarily be configured to allow the use of nuts or other tightening mechanisms on its ends to hold it in firm engagement with the edges of slot 128.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A mounting structure for use on an endless belt conveyor system, said mounting structure comprising:
   a framework;
   a framework mounting means included on said framework for mounting said framework to said endless belt conveyor system;
   a drive wheel;
   a drive shaft engaged with said drive wheel for rotation thereby;
   shaft support means pivotally attached to said framework, offset from said framework and mounting said drive shaft for pivotal movement in a vertical plane;
   power transfer means for connecting said drive shaft to a driven device in a power transfer relation, a centrifugal switch having switch contacts and an input shaft operatively engaged with said switch contacts, said input shaft also being connected to said drive shaft by said power transfer means; and
   a contact condition indicating a circuit comprising a light means engaged across said contacts for being illuminated when said contacts are opened and being extinguished when said contacts are closed.

2. The device as defined in claim 1 wherein said power transfer means includes a flexible coupling.

3. The device as defined in claim 1 wherein said conveyor comprises a suspended conveyor having a cable extending along each side thereof; said mounting means including clamp means for connecting said framework to one of said cables; and stabilizing bar means extending between said mounting means and the other of said cables.

4. The device as defined in claim 1 wherein said stabilizing bar means is formed in two sections, one of said sections telescopically receiving the other of said sections.

5. The device as defined in claim 1 wherein said power transfer means includes a step-up drive gear arrangement attached to said drive shaft.

6. The device as defined in claim 1 and further including a force transfer means extending between said framework and said shaft support means for applying downward pressure on said drive wheel.

7. The device as defined in claim 6 wherein said force transfer means includes a turnbuckle.

8. The device as defined in claim 6 wherein said force transfer means includes a spring biased plunger.

9. The device as defined in claim 1 wherein said shaft support means is mounted to said framework by a vertical adjustment means for providing vertical adjustability thereon, said vertical adjustment means including a plurality of holes drilled through said framework.

10. The device as defined in claim 9 wherein said vertical adjustment means includes at least one slot formed vertically in said framework.

* * * * *